United States Patent [19]

Gorner

[11] 4,268,297
[45] May 19, 1981

[54] METHOD OF PRESTRESSING AT LEAST ONE BENT SHEET OF A SANDWICH TYPE SAFETY GLASS

[75] Inventor: Julius K. Gorner, Witten, Fed. Rep. of Germany

[73] Assignee: BFG Glassgroup, France

[21] Appl. No.: 70,788

[22] Filed: Aug. 29, 1979

[30] Foreign Application Priority Data

Sep. 20, 1978 [DE] Fed. Rep of Germany ....... 2840834

[51] Int. Cl.³ .............................................. C03B 27/04
[52] U.S. Cl. ....................................... 65/104; 65/107; 65/114; 65/115
[58] Field of Search ................. 65/104, 114, 348, 351, 65/107, 115

[56] References Cited

U.S. PATENT DOCUMENTS

| | | | |
|---|---|---|---|
| 2,118,183 | 5/1938 | Fowler | 65/348 X |
| 2,680,936 | 6/1954 | Grotefeld | 65/104 |
| 3,008,272 | 11/1961 | Black et al. | 65/104 X |
| 3,125,430 | 3/1964 | Richardson | 65/114 |

*Primary Examiner*—Arthur D. Kellogg
*Attorney, Agent, or Firm*—Parmelee, Miller, Welsh & Kratz

[57] ABSTRACT

A method of prestressing at least one of the glass sheets of a sandwich safety glass, while being bent in a furnace, the glass sheet, after passing through a bending zone, being passed by a blow system and cooled by cooling air in the furnace in a temperature zone above the transformation point but below the deformation point of the glass, and an apparatus for such prestressing comprising a travelling die supporting superimposed sheets, a bending furnace zone to soften the sheets, and a cooling zone, the cooling zone having a blow system that subjects the bent sheet or sheets to cooling air.

19 Claims, 3 Drawing Figures

METHOD OF PRESTRESSING AT LEAST ONE BENT SHEET OF A SANDWICH TYPE SAFETY GLASS

BACKGROUND OF THE INVENTION

This invention relates to a method of prestressing at least one of the glass sheets of a sandwich safety glass, said sheets being bent in a bending furnace by the action of gravity, in superimposed relationship on a bending die having a substantially horizontal shaping surface, the die together with the glass sheets in superimposed relationship thereon passing through the furnace and the superimposed glass sheets, after passing through the bending zone in which the sheets are heated to the softening temperature and bent, being taken past a blow system which subjects the bent sheet or sheets to the action of cooling air and which is disposed in the furnace in a temperature zone above the transformation point but below the deformation point of the glass, and apparatus for prestressing at least one of the superimposed sheets of a sandwich safety glass, which are bent simultaneously by the action of gravity in the bending furnace, comprising a substantially horizontal die which travels through the furnace in a direction parallel to the axis of curvature of the sandwich, and which supports the superimposed sheets, a bending furnace zone through which the die travels and in which the superimposed sheets are heated to the softening temperature and bent, and a cooling zone, which follows the bending zone and is disposed in a temperature zone above the transformation point but below the deformation point of the glass, said cooling zone comprising a blow system which subjects the bent sheet or sheets to cooling air, suitable more particularly for performing the above-described process.

In a known process and a known apparatus of the type described hereinbefore (DOS No. 26 50 206), the two superimposed sheets are bent at a temperature above the transformation point and then vertically subjected to cooling air so that only the edge of the sheet is covered by the streams of cooling air, so that compression stresses are produced there. The compression stresses produced at the edge of the sheet with the process and apparatus according to DOS No. 26 40 206 are intended to guarantee clear vision in the stress-free central zone in the event of breakage of the sandwich type safety glass, which is of use more particularly as a windscreen for motor vehicles. However, it has been found, particularly with sandwich type safety glass consisting of individual sheets of different thicknesses, such as are frequently used as motor vehicle windscreens, in which the thinner sheet of the sandwich is disposed on the inside of the motor vehicle, that the safety glass does not have the required resistance to breakage if the central zone, particularly of the thin inner sheet, is not prestressed or toughened but is substantially stress-free, and in addition it does not give a breakage pattern in the form of extensive cracking which is desirable as a compromise between the glass strength requirements, on the one hand, and low risk of injury due to cuts, on the other hand.

DAS No. 10 35 328 discloses a process in which the entire surface of the individual sheets is subjected to cooling air in the bending furnace, so that they are prestressed. However, this process is not suitable for satisfactorily improving the properties of the individual sheets of a safety glass sandwich bent in superimposed relationship on the bending die to give slight prestressing. German patent specification No. 616 445 also describes the prestressing of bent sheets by cooling air nozzles, although here again there is no guarantee of satisfactory slight prestressing of the individual sheets of the sandwich bent in superimposed relationship on a bending die. Other prestressing systems operating with cooling air are described, for example, in DAS No. 10 80 742, German patent specification No. 11 14 993 and DAS No. 20 00 271, but all the processes and apparatus described therein are not specifically suitable for slightly prestressing or toughening at least one of the individual sheets of a safety glass sandwich are bent in superimposed relationship on a bending die.

The object of the present invention is to provide a process and apparatus of the type indicated hereinbefore whereby at least one of the individual sheets of a safety glass sandwich, bent in superimposed relationship on a bending die by gravity, is slightly prestressed. The object of the process and apparatus is to give the slightly prestressed and particularly very thin sheet of the sandwich the properties of high-strength glass.

SUMMARY OF THE INVENTION

According to the invention, in a process of the type on which the invention is based, to this end, at least one bent sheet is subjected to cooling air over its entire surface.

The apparatus of the type referred to hereinbefore is characterized according to the invention in that the blow system comprises at least one blow pipe which is disposed transversely of the direction of conveyance and which has cooling air holes directed towards the glass sheet for cooling, the blow pipe being so curved as to match the transverse curvature of the sheets that the cooling air holes have substantially the same distance from the surface of the sheet over the entire transverse dimension of the individual sheets.

Particularly preferred embodiments of the process and apparatus according to the invention are disclosed. A particularly advantageous development of the apparatus according to the invention is characterized by a suction and support system which is disposed in the cooling zone and which is movable therein with the die in the direction of conveyance, for temporarily lifting the top sheet from the sheet therebeneath, and by at least two or four blow pipes, at least one of which is disposed above and at least one of which is disposed beneath the passing lifted top sheet.

With the process and apparatus according to the invention it is possible slightly to prestress uniformly in a simple manner the individual sheets of safety glass sandwiches of the kind in question, more particularly the top very thin sheet on the die, for what is known as asymmetrical sandwich safety glass, so that the single sheet subjected to the cooling air is given the properties of high-strength glass. Consequently, not only is the breaking strength of the sandwich safety glass greatly increased, but in addition there is an improved breakage pattern with the required extensive cracking. According to the invention, therefore, at least the top thin inner sheet of an asymmetrical sandwich type safety glass for use as a motor vehicle windscreen is so subjected to cooling air in the bending furnace itself over its entire surface such that the inner sheet receives slight prestressing or toughening like a high-strength glass. Of course it is also possible to cool both the top sheet and the bottom thicker outer sheet of such asymmetrical sandwich type safety glass. As in the preferred embodiment of the apparatus according to the invention described, it is particularly advantageous for the top sheet to be lifted from the bottom sheet by a suction and support system near the blow system, the said suction and support system moving with the bending die as it travels through the furnace and depositing the sheet on the bottom outer sheet on the bending die as it passes the blow pipes which, in this case, are disposed both above and below the raised top inner sheet.

Other features and advantages of the invention will be apparent from the claims and from the following description, which explains in detail one exemplified embodiment with reference to the diagrammatic drawing wherein:

DETAILED DESCRIPTION

Figure 1:
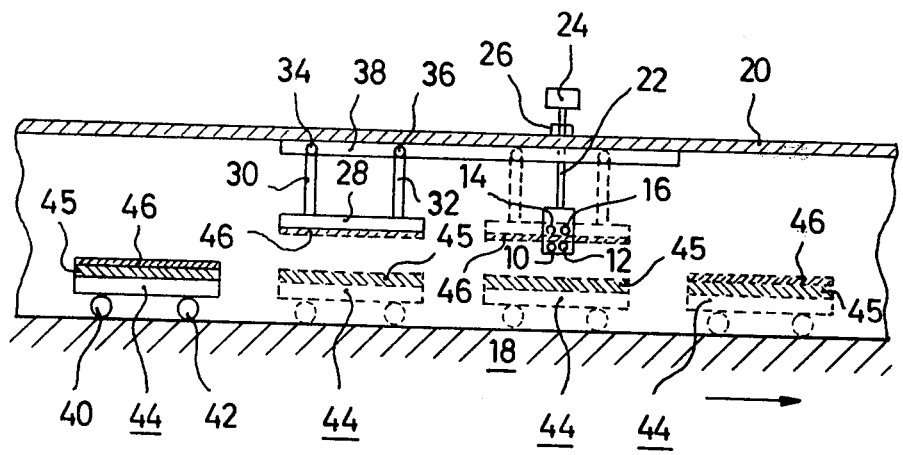
FIG. 1 is an exemplified embodiment of an apparatus according to the invention seen from the side of the bending furnace, in partial vertical section through the longitudinal central axis of the furnace.

Referring to FIG. 1, the exemplified embodiment of the apparatus according to the invention comprises a blow system consisting of pairs of blow pipes 10, 12 and 14, 16 extending substantially transversely of the longitudinal direction of the bending furnace, the base of which is denoted by reference 18 in FIG. 1 and the roof of which is denoted by reference 20.

The blow pipes 10, 12 and 14, 16 are arranged in pairs with vertical spacing as shown in FIG. 1 and are supported on a supply pipe 22 which extends up through the furnace roof 20 and leads to a control system 24 to which cooling air in the form of compressed air is fed from a source (not shown). The vertical positions of the pairs of blow pipes 10, 12 and 14, 16 can be adjusted independently of one another by means of an adjusting system, from a position outside the furnace roof 20, FIG. 1 showing an adjusting ring 26 of this system.

FIG. 1 also shows a supporting and suction system 28 which, as shown in FIG. 1, comprises two elongate suction strips which extend parallel to the longitudinal axis of the furnace and which are suspended from supports 30, 32, which are adapted to reciprocate in the direction of the longitudinal axis of the furnace via rollers 34, 36 which together form a trolley, in a guide 38 attached to the roof 20. FIG. 1 shows the supporting and suction system 28 comprising supports 30, 32 and trolley 34, 36 in solid lines in a first position on the left in FIG. 1, and in another position farther to the right, which is shown in broken lines, near the blow system 10, 12, 14, 16.

Finally, FIG. 1 also shows in solid lines on the left a bending die 44 which travels through the furnace on rollers 40, 42 in the direction of the arrow shown in the right in FIG. 1, said die having two glass sheets 45, 46 thereon. In the position of the die 44 and glass sheets 45, 46 shown in solid lines on the left in FIG. 1, the glass sheets have already been bent in superimposed relationship in a zone of the furnace 18, 20 in which the temperature is above the deformation point of the glass making up the individual sheets 45, 46, e.g. above 585° C. Consequently, the two sheets 45, 46 of the laminated safety glass under production are curved (curvature not visible in the drawing) about an axis of curvature parallel to the longitudinal axis of the furnace.

In addition to the position of the die 44 shown in solid lines in FIG. 1, in which position the glass sheets 45, 46 rest on the die, FIG. 1 also shows the die 44 farther to the right in broken lines, in a position in which the top sheet 46 has been lifted by the suction and support system 28, from the bottom sheet 45 still resting on the die 44. FIG. 1 then shows a position of the die 44 in broken lines in which the top sheet 46, lifted from the bottom sheet 45 by the suction and support system 28, in the position shown in broken lines has been brought by the trolley 34, 36 along the guide 38 into the zone of the blow system 10, 12, 14, 16. Finally, FIG. 1 also shows in broken lines an end position of the die 44 in which the two sheets 45, 46 again rest in superimposed relationship on the die 44, thus concluding the blow operation, which will be described hereinafter.

Figure 2:
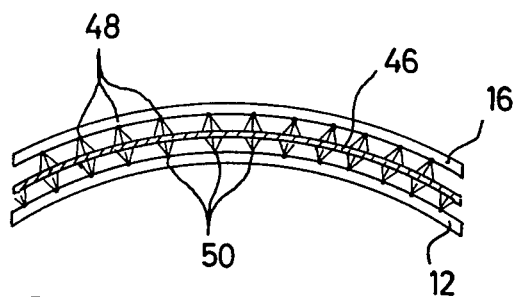
FIG. 2 is an enlarged scale view of one exemplified embodiment of the blow pipes used in the apparatus shown in FIG. 1, in section perpendicular to the longitudinal central axis of the furnace.

FIG. 2 shows that the blow tubes 16, 12 shown in diagrammatic section at right angles to the longitudinal axis of the furnace are curved to match the curvature of the top sheet 46 fed between them by the system 28, while a number of cooling air holes 48, 50 to which compressed air is fed via the control system 24 and the supply pipe 22 as shown in FIG. 1, direct jets of cooling air uniformly over the entire surface of the top sheet 46. The top sheet passes the blow tubes 12, 16 perpendicularly to the drawing plane of FIG. 2 and is lifted by the suction and support system 28 from the bottom sheet 45, which continues to rest on the die 44, the cooling air being applied both to the top outer surface and the bottom inner surface of the sheet 46 with respect to FIG. 2.

Figure 3:
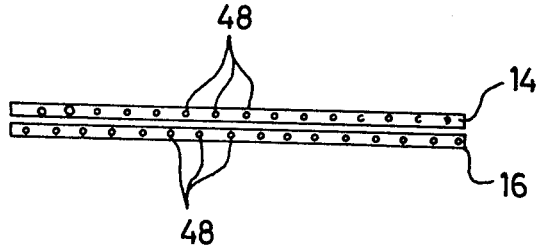
FIG. 3 is a bottom view of blow pipes shown in FIG. 2.

FIG. 3 shows that the top two blow tubes 14, 16 (the same remarks apply to the bottom pair of blow tubes 10, 12) are disposed in close adjacent relationship, the individual cooling air holes 48 in the two parallel and adjacent blow pipes 14, 16 being staggered. The cooling air holes 48 may, as shown in the example illustrated, have spacing of 25 mm in the longitudinal direction of the blow pipes 14, 16, given a hole diameter of 2 mm in each case, so that there is a cooling air hole 48 and 50 respectively every 12.5 mm in the longitudinal direction of the pairs of blow pipes 14, 16 and 10, 12 respectively.

The above-described system illustrated diagrammatically operates as follows by the method according to the invention.

When the two glass sheets 45, 46 have been heated to the softening temperature, i.e. a temperature above the deformation point of the glass, and bent simultaneously in superimposed relationship on the die 44, in the bending zone which is not shown in FIG. 1, because it is farther to the left, the sheets curved in this way are transported, as shown in FIG. 1, by the bending die 44 travelling from left to right in respect of FIG. 1 through the furnace 18, 20 parallel to the longitudinal axis of the furnace, and are brought into a temperature zone in which the temperature is below the deformation point, but above the transformation point, of the glass making up the sheets 45, 46, i.e., for example, in the range of 525° to 585° C. When the die 44 is in the position shown in broken lines in FIG. 1, the top sheet 46 is lifted from the bottom sheet 45 still on the die 44, by means of the suction strips which act on the longitudinal edges of the sheet 46 parallel to the furnace longitudinal axis, and which form part of the vertically adjustable support and suction system 28. The die 44, on the one hand, and the support and suction system 28 suspended from the trolley 34, 36, on the other hand, then move synchronously in the furnace farther to the right in FIG. 1, the raised top sheet 46 being taken through the pairs of blow pipes 10, 12 and 14, 16, where jets of cooling air are applied. After passing through the blow system comprising the pipes 14, 16 and 10, 12 respectively, the sheet 46 is replaced on the bottom sheet 45, the final condition being shown in dotted lines fully on the right in FIG. 1. From here the die 44 together with the sheets 45, 46 of the sandwich safety glass under manufacture pass to the furnace exit in known manner.

The cooling air fed by the blow pipes 14, 16 and 10, 12 respectively slightly prestresses or toughens the raised top sheet 46 to give a safety glass which gives an improved breakage pattern in the event of breakage of a safety glass made from the sheets 45, 46, particularly if the sheet 46 is the inner sheet of the sandwich, because glass of this kind does not break with the breaks in a radiating form, but rather like a wired glass with an extensive cracking pattern. Glass of this kind also has a resistance of two to two-and-a-half times that of non-toughened standard glass of the same thickness so that the method according to the invention is particularly suitable for toughening very thin sheets 46, which are preferably used as the inner sheets of laminated safety glass.

Of course, in a modification of the exemplified embodiment of the system according to the invention, the top sheet 46 is not lifted from the bottom sheet 45; instead, the two sheets resting on the die 44 are taken past a pair of blow pipes 14, 16 disposed above the top sheet 46. In that case, only the top outer surface of the sheet 46 is subjected to the action of cooling air, but again this gives a high-strength glass with improved properties as compared with standard glass. In another modification of the system and method according to the invention, the bottom sheet 45 may additionally be subjected to cooling air, in which case another pair of blow pipes could be provided, for example, in the zone of the blow system shown in FIG. 1, to subject the surface of the bottom sheet 45 to cooling air.

Of course, with the method according to the invention it is also possible to replace the blow pipes or other kinds of air nozzles forming the blow system, by radiant coolers so that again one or both sheets are uniformly prestressed or toughened, thus providing a high-strength glass. In the exemplified embodiment illustrated, the suction and support system 28, i.e. particularly the supports 30, 32, can be taken past the blow pipes 10, 12, 14, 16 by arranging for at least the bottom blow pipes 12, 10 to be pivotable. In this way the top sheet 28 can first be raised against the top blow pipes 14, 16 and then the bottom blow pipes 10, 12 can be pivoted inwardly. In another system, the bottom blow pipes could be laterally supported only outside the path of movement of the support and suction system 28 and project freely into the intermediate space between the sheets.

Sandwich type safety glass comprising a thin inner plate of high-strength glass slightly prestressed by the method according to the invention has a much better flexural breaking strength as compared with sandwich safety glass of the same construction but consisting of standard glass. Experiments carried out with such glass have shown that flexural breaking strength improvments from 30 to 100% can be obtained with different types of sandwich safety glass of the kind used for different types of vehicles.

The features of the invention disclosed in this specification, in the drawings, and in the following claims, are important to embodiments of the invention in its various forms both individually and in any desired combination.

What is claimed is:

1. In a process for pre-stressing at least one of the individual panes of a compound safety pane, which panes are laid on top of one another on a bending die, including the steps of traversing the bending die with said panes lying thereon through a bending furnace in a direction of travel which is parallel to the bending axis of the compound safety pane after traveling through a bending zone, heating said panes to the softening temperature in the bending furnace, bending said heated panes through the influence of gravity, and effecting the glazing of the uppermost individual pane with cool air in a temperature zone above the transformation point but below the deformation point of glass, the improvement consisting of the step of treating exclusively and uniformly only the upper outside surface of the upper bent individual pane with cool air to effect glazing of said upper pane.

2. In a process for pre-stressing at least one of the individual panes of a compound safety pane, which panes are laid on top of one another on a bending die including the steps of traversing the bending die with said panes lying thereon through a bending furnace in a direction of travel which is parallel to the bending axis of the compound safety pane after traveling through the bending zone, heating said pane to the softening temperature in the bending furnace, bending said heated panes through the influence of gravity, and effecting the glazing of the uppermost individual pane with cool air in a temperature zone above the transformation point but below the deformation point of glass, the improvement consisting of the steps of lifting the topmost pane up from the bottom pane and treating the upper outer surface and lower inner surface of the lifted pane with cool air to effect glazing thereof.

3. The process of claims 1 or 2 wherein the temperature zone in which the treating of the pane with cool air is in the range of from about 525° C. to 585° C.

4. The process of claim 3 wherein the temperature zone is at 550° C.

5. The process of claim 3 including the step of regulating the cool air used in treating the pane to control the flow of air contacting the surface of the pane being treated.

6. The process of claim 1 wherein the step of treating the pane with cool air includes cooling said pane by a means for blowing said cool air, said means being stationary relative to the traversing motion of the bending die and consisting of at least two parallel blow-pipes having a plurality of cooling air holes directed toward said pane to be cooled, said holes being offset against one another in said blow-pipes and said blow-pipes being curved to correspond to the transverse bending of said pane so that all of the cooling air holes are essentially the same distance from the surface of the pane.

7. The process of claim 2 wherein the step of lifting the pane includes supporting said pane by a suction support means movable in the direction of travel of the bending die in order to lift the upper single pane from the single pane therebelow and the step of treating the pane with cool air includes cooling said pane with means for blowing said cool air, said blowing means being stationary relative to the traversing motion of the bending die and consisting of at least two parallel blow pipes arranged so that at least one blow pipe is located below the lifted upper single pane of glass as said pane travels past said means for blowing cool air, said blowpipes having a plurality of cooling air holes directed toward said pane to be cooled, said holes being offset against one another in said blow pipes and said blow pipes being curved to correspond to the transverse bending of said pane so that the cooling air holes are essentially the same distance from the surface of the pane.

8. The process of claim 7 wherein the step of treating the pane with cool air by means for blowing said air includes blowing said cool air from at least one blow pipe located below the lifted pane of glass with said blow pipe being movable toward and away from said pane.

9. The process of claims 6 or 8 wherein the step of treating the pane with cool air by means for blowing said air includes blowing said cool air through a series of blowpipes aligned at intervals with each other and arranged in the direction of travel of the bending die.

10. The process of claim 9 wherein the step of treating the pane with cool air includes treating said pane in a temperature zone extending along a furnace area which is essentially three times as long as the bending die traveling therethrough.

11. The process of claim 10 wherein the step of treating the pane with cool air includes controlling said air by a means for regulating the flow of cool air into the means for blowing cool air.

12. The process of claim 11 wherein the step of treating the pane with cool air includes controlling said air by a means for regulating the flow of cool air to each of said blowpipes independently of each other.

13. The process of claim 12 wherein the step of treating the pane with cool air includes blowing air through blowpipes having air holes spaced a distance of about 25 mm apart along the longitudinal axis of each blowpipe.

14. The process of claim 12 wherein the step of treating the pane with cool air includes blowing air through blowpipes having air holes with a diameter of about 2 mm.

15. The process of claim 14 wherein the step of treating the pane with cool air includes blowing air through blowpipes which are movable so as to permit adjustment of the relative distance of the blowpipe to the pane of glass being cooled thereby.

16. The process of claim 15 wherein the step of treating the pane with cool air includes supporting the blowpipes with blowpipe support means consisting of lines extending outwardly through the furnace roof.

17. The process of claim 7 wherein the step of lifting the upper pane with the suction means includes supporting said panes by suction strips on said suction means which strips engage the longitudinal edges of the upper pane lying parallel to the direction of travel of the bending die.

18. The process of claim 17 wherein the step of lifting the upper pane with the suction means includes providing suction through a plurality of small suction tubes in each suction strip.

19. The process of claim 18 wherein the step of lifting the upper pane with the suction means includes supporting said suction means by a truck, said truck being mounted for movement in the furnace back and forth in the direction of travel of the bending die.

* * * * *